Figure 1:
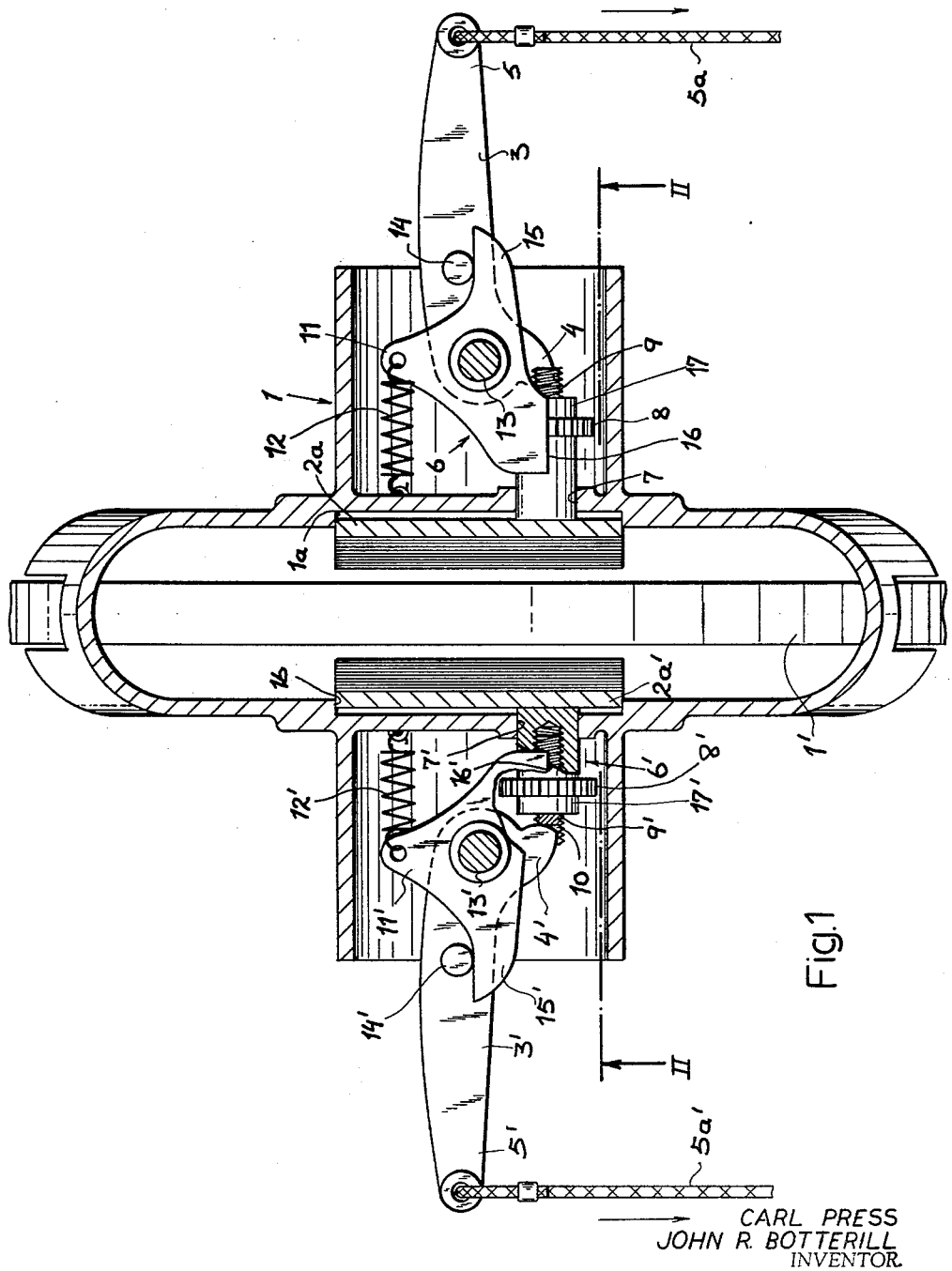

Feb. 16, 1965    C. PRESS ETAL    3,169,608
DISK BRAKE AND ADJUSTING MEANS THEREFOR
Filed Dec. 11, 1963    2 Sheets-Sheet 1

CARL PRESS
JOHN R. BOTTERILL
INVENTOR.

BY Mestern, Ross & Mestern

CARL PRESS
JOHN R. BOTTERILL
INVENTOR.

United States Patent Office 3,169,608
Patented Feb. 16, 1965

3,169,608
DISK BRAKE AND ADJUSTING MEANS
THEREFOR
Carl Press, Frankfurt-Bonames, and John R. Botterill, Dreieichenhain, Germany, assignors to Alfred Teves Maschinen- und Armaturenfabrik KG., Frankfurt am Main, Germany, a corporation of Germany
Filed Dec. 11, 1963, Ser. No. 329,837
Claims priority, application Germany, Dec. 19, 1962, T 23,227
8 Claims. (Cl. 188—72)

Our present invention relates to disk brakes of the general type described in copending application Ser. No. 293,653 filed July 9, 1963 by one of the present inventors and, more particularly, to automatic compensating and adjusting means for repositioning the brake shoe or shoes of the device upon wear thereof.

It has been known to provide so-called "drum" brakes, having a pair of arcuate brake shoes displaceable into engagement with the cylindrical surface of a brake drum, with automatic adjusting means for compensating for the wear of the brake linings, this adjusting means including a compensating lever displaceable during the brake stroke for shifting the brake linings closer to the drum. It has been found to be impossible practically to provide compensating means of this type for manually operable disk brakes without increasing the dimensions of the brake and so modifying its basic structure as to render it unsuitable for most of the purposes for which it is designed. Disk brakes, for example, generally make use of one or more brake shoes which are shiftable transversely to the plane of the disk-like braking surface and do not swing into engagement therewith in the manner of the brake shoes of drum-type brakes. Moreover, disk brakes do not usually have provision for the mounting of intricate adjusting means in a stationary condition and cannot accommodate the aforementioned known adjusting means.

It is, therefore, the principal object of the present invention to provide an improved system for automatically adjusting the position of a brake shoe of a disk brake so as to compensate for wear of the braking surfaces.

A further object of this invention is to provide an adjusting means of the character described which is of relatively simple construction but yet which operates efficiently and without tendency to failure.

These and other objects of the invention, which will become apparent hereinafter, are attained by the provision of a disk-brake system which comprises a brake disk and housing means displaceable relatively to one another and a brake shoe shiftably mounted upon the housing for displacement tranversely to the complementary braking surface of the disk; the actuating means for the brake shoe includes a lever, which can be directly or indirectly displaced by the operator of the brake, swingable about an axis perpendicular to the direction of displacement of the brake shoe and bearing thereon via one member of a pair of relatively displaceable elongated transmission elements forming part of the adjusting means of the present invention. The adjusting means, as indicated hereinabove, comprises a pair of telescoped relatively displaceable elements advantageously movable in the direction of displacement of the brake shoe and forming an elongatable transmission between the latter and the actuating lever; one of these elements bears upon the brake shoe while the other is engageable by the brake-actuating lever. The adjusting means further comprise a pawl-and-ratchet mechanism for displacing the two elements relatively in the direction of displacement of the brake shoe, the mechanism including an adjusting lever swingable about the axis of the actuating lever and engageable thereby during the braking stroke for operating the adjusting means.

The relatively displaceable elements of the adjusting means include two threadedly engageable members, one of which is provided with a toothed wheel adapted to cooperate with the adjusting lever for rotating one of the elements with respect to the other. Thus the adjusting means can include an internally threaded sleeve, journaled in the brake housing or in one of a pair of brake members adapted to engage the disk as shown in the above-identified copending application, the sleeve being further shiftable axially and parallel to the direction of displacement of the movable brake shoe with which it cooperates to urge it into engagement with the disk. The ratchet wheel can then be formed on the periphery of this sleeve for engagement by a portion of the adjusting lever serving as a pawl for advancing the sleeve. The nonrotary element of the adjusting means is provided with retaining means engageable with the actuating lever for preventing its rotation together with the sleeve threaded into the nonrotary element. This retaining means may include a notch or groove provided in the head of the nonrotary adjusting element and receiving a portion of the actuating lever. The adjusting lever preferably cooperates with an abutment provided on the actuating lever, with which it has a common fulcrum, and is engaged by resilient means for urging it in a sense opposite to that in which it is entrained by the actuating lever, the resilient means effecting engagement of the toothed wheel by the adjusting lever upon release of the brake to step this wheel and axially shift the cooperating elements of the adjusting means. The sleeve can, therefore, be advanced to bear again upon the respective brake shoe.

Figure 2:
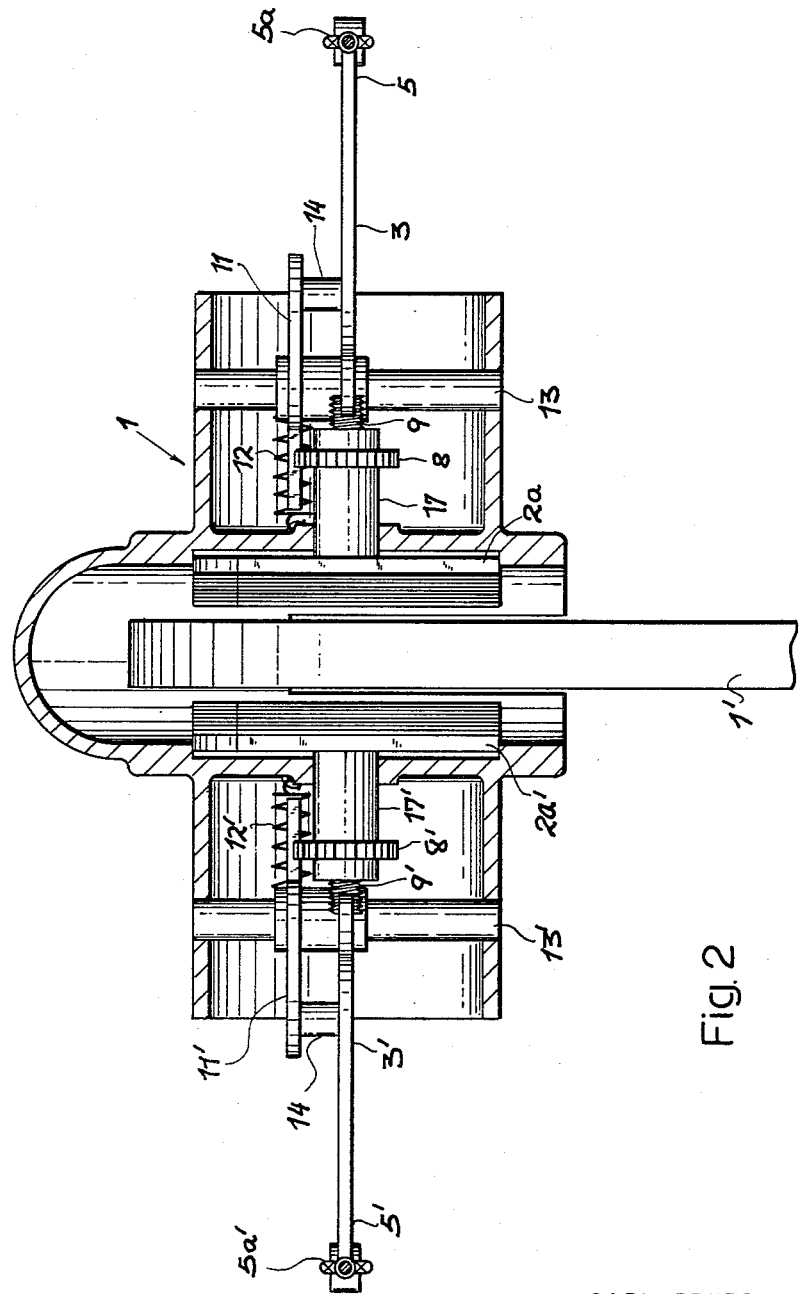

The above and other objects, features and advantages of the present invention will become more readily apparent from the following description, reference being made to the accompanying drawing in which:

FIG. 1 is a partial cross-sectional view through a disk brake taken in a plane parallel to the axis of the rotary member of the brake system; and FIG. 2 is a cross-sectional view taken along the lines II—II of FIG. 1.

While the disk brakes shown in FIGS. 1 and 2 comprise a pair of brake shoes each having an actuating lever and adjusting means, according to the invention, for compensating for brake-shoe wear, it should be noted that, in some cases, only a single brake shoe and adjusting means may be required while, in other cases, it may be desirable to construct the brake housing so as to constitute a yoke whose nonadjustable brake shoe bears upon a surface of the disk remote from that engaged by the adjustable element.

In the drawing there is shown a brake housing 1 extending on opposite sides of a brake disk 1' which can be mounted upon a wheel axle or the drive shaft of an automotive vehicle. On each side of the disk 1', the housing 1 forms guide means 1a, 1b for a pair of brake shoes 1, 2' shiftable transversely to the braking faces of disk 1' by actuating levers 3, 3' respectively. The latter are provided with thumb-like arms 4, 4' for shifting the respective brake shoes 2, 2' and control arms 5, 5' which can be manually actuable either directly or by means of some other force-transmission means (e.g. cables 5a and 5a' respectively).

Each of the brake shoes 2, 2' is provided with respective adjusting means generally designated as 6 and 6' respectively, these adjusting means including internally threaded sleeves 17, 17', which are journaled at 7, 7' for rotation within the housing and are axially shiftable therein parallel to the direction of displacement of brake shoes 2, 2', i.e. transversely to the disk 1'. Free rotation of the sleeves 17, 17' is restricted by frictional engagement thereof with the respective outer faces 2a and 2a' of the brake shoes 2, 2' when the latter are urged against the disk 1'. The sleeve elements are each provided with respective toothed wheels 8 and 8' forming ratchets engageable by the pawl portion 16, 16' of the adjusting lever 11, 11'. Moreover, sleeves 17, 17' receive the externally threaded elements or bolts 9, 9' with respect to which they are angularly and axially displaceable upon operation of the ratchet. Bolts 9, 9' are provided with respective grooves or notches 10 and 10' in which the arms 4 and 4' of the levers 3, 3' extend to prevent rotation of these bolts. A tension spring 12, 12' engages each of the levers 11 and 11' and urges them in the counterclockwise and clockwise senses respectively while abutments 14, 14' of the actuating levers 3, 3' are cammingly engageable with lever arms 15, 15' of the adjusting levers 11, 11' to urge the latter against the force of their respective springs 12, 12' in the sense of displacement of the actuating levers 3, 3' about their common fulcra 13, 13'.

To operate the brake, cables 5a, 5a' are tensioned to swing actuating lever 3 in the clockwise sense and actuating lever 3' in the counterclockwise sense simultaneously. It may be noted, parenthetically, that only one cable is required if some other mechanical link is provided for the concurrent operation of the actuating levers 3, 3'. These levers, swung in the direction of the arrows, entrain their respective adjusting levers 11, 11' in the same sense upon engagement of the abutment 14, 14' with lever arms 15, 15' to tension springs 12 and 12', while drawing the pawl portions 16, 16' out of engagement with the ratchet wheels 17, 17'. The pawl portions 16 and 16' of the adjusting levers 11 and 11' have edges which extend generally in the direction of displacement of the sleeves 17 and 17' so that they can re-engage ratchet wheels 8 and 8' in a pawl-and-ratchet sense regardless of the axial displacement of the respective ratchet wheel. The edges of pawl 16, 16' are drawn back by a distance corresponding to one or more teeth of the wheel 8, 8', depending upon the degree of displacement of levers 3, 3' until lever arms 4, 4' advance the brake shoes 2, 2' into engagement with the disk 1'. Concurrently with the displacement of levers 3, 3', arms 4, 4' bear against the bolts 9, 9' to urge the sleeves 17, 17', threadedly engaging these bolts, into engagement with the respective brake shoes 2, 2' and displace the latter in the direction of the disk 1'. Since the sleeves 17, 17' frequently engage the brake shoes 2, 2' and the housing 1, there is no relative displacement of elements 8, 9 and 8', 9' during brake actuation.

When tension is relieved in cables 5a, 5a', springs 12, 12' effect a counterclockwise displacement of adjusting lever 11 and a clockwise displacement of adjusting lever 11' so that these levers entrain the actuating levers 3, 3' via abutments 14, 14' into their normal inactive positions. Simultaneously, the pawl portions 16, 16' advance the ratchet wheels 8, 8' to axially shift the respective sleeves 17, 17', which have been relieved by release of levers 3, 3' to extend the telescoped elements 9, 17 and 9', 17' and compensate for any wear of the brake shoes, the sleeves being advanced into contact with the respective brake shoes.

The invention described and illustrated is believed to admit of many modifications within the ability of persons skilled in the art, all such modifications being considered within the spirt and scope of the appended claims.

We claim:

1. A disk-brake system comprising housing means; a brake disk rotatable relatively to said housing means; at least one brake shoe shiftable with respect to said housing means toward said disk; actuating means on said housing for displacing said brake shoe, said actuating means including an actuating lever swingable about an axis generally transverse to the direction of displacement of said disk; adjusting means interposed between said actuating means and said brake shoe for compensating the position of said brake shoe with respect to said actuating means in accordance with wear of said brake shoe, said adjusting means including elongatable transmission means and pawl-and-ratchet means engageable by said actuating means for extending said transmission means and including an adjusting lever fulcrumed on said axis and entrainable by said actuating lever for operating said pawl-and-ratchet means, said elongatable transmission means including a pair of threadedly interconnected elongated elements; and retaining means for preventing rotation of one of said elements, the other of said elements being journaled in said housing means and axially shiftable for a displacement of said brake shoe, said pawl-and-ratchet means including a toothed wheel on said other of said elements and a pawl portion of said adjusting lever for stepping said wheel and rotating said other of said elements.

2. A disk-brake system as defined in claim 1 wherein said retaining means includes a groove formed in said one of said elements and a portion of said actuating lever received in said groove.

3. A disk-brake system as defined in claim 2 wherein said elements constitute said transmission means and said pawl portion has an elongated edge cooperating with said wheel and extending generally parallel to said elements.

4. A disk-brake system as defined in claim 2, further comprising resilient means engaging said adjusting lever for displacing it in such sense as to step said wheel.

5. A disk-brake system as defined in claim 4 wherein said actuating lever is provided with abutment means cammingly engageable with said adjusting lever for withdrawing said pawl portion from engagement with said wheel while concurrently displacing said elements axially to shift said brake shoe in the direction of said disk.

6. A disk-brake system as defined in claim 5 wherein said other of said elements is an internally threaded sleeve having a face abutting a surface of said brake shoe remote from said disk for frictional engagement of said sleeve by said brake shoe upon axial displacement of said sleeve by said actuating lever to prevent rotation of said sleeve.

7. A disk-brake system as defined in claim 6 wherein said one of said elements is a bolt threadedly received in said sleeve.

8. A disk-brake system as defined in claim 7, further comprising another brake shoe engageable with a surface of said disk remote from the first-mentioned brake shoe, and further adjusting means for shifting said other brake shoe to compensate for wear thereof.

References Cited by the Examiner
UNITED STATES PATENTS

| | | | |
|---|---|---|---|
| 1,606,683 | 11/26 | Athimon | 188—196 |
| 2,669,327 | 2/54 | Chamberlain | 188—72 |
| 2,940,554 | 6/60 | Cameron | 188—196 X |
| 3,103,991 | 9/63 | Flinn | 188—196 X |
| 3,111,198 | 11/63 | Hodkinson | 188—196 X |

EUGENE G. BOTZ, *Primary Examiner.*

DUANE A. REGER, *Examiner.*